US012680703B2

(12) United States Patent
Chu et al.

(10) Patent No.: US 12,680,703 B2
(45) Date of Patent: Jul. 14, 2026

(54) AIR PURIFIER

(71) Applicant: SAMSUNG ELECTRONICS CO., LTD., Suwon-si (KR)

(72) Inventors: Euysung Chu, Suwon-si (KR); Wooseog Song, Suwon-si (KR); Taeyong Lee, Suwon-si (KR); Youngseok Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 660 days.

(21) Appl. No.: 18/093,626

(22) Filed: Jan. 5, 2023

(65) Prior Publication Data

US 2023/0243521 A1 Aug. 3, 2023

Related U.S. Application Data

(63) Continuation of application No. PCT/KR2022/017616, filed on Nov. 10, 2022.

(30) Foreign Application Priority Data

Feb. 3, 2022 (KR) ........................ 10-2022-0014387

(51) Int. Cl.
*F24F 1/0033* (2019.01)
*B01D 46/00* (2022.01)
(Continued)

(52) U.S. Cl.
CPC ........ *F24F 1/0033* (2013.01); *B01D 46/0045* (2013.01); *B01D 46/10* (2013.01);
(Continued)

(58) Field of Classification Search
CPC ...... F24F 1/0033; F24F 1/0029; F24F 1/0073; F24F 1/0071; F24F 2013/205; F24F 8/10;
(Continued)

(56) References Cited

U.S. PATENT DOCUMENTS 10,718,533 B2 7/2020 Kim et al.
2003/0150326 A1 8/2003 Chasen
(Continued)

FOREIGN PATENT DOCUMENTS

CN 1782603 A 6/2006
CN 215062671 U 12/2021
(Continued)

OTHER PUBLICATIONS

KR100531087B1 Translation Obtained from Espacenet on May 30, 2025 (Year: 2025).*
(Continued)

*Primary Examiner* — In Suk C Bullock
(74) *Attorney, Agent, or Firm* — STAAS & HALSEY LLP

(57) ABSTRACT

An air purifier including a housing including an inlet, a first outlet, and a second outlet; a first air blower arranged in the housing and configured to blow air from the inlet in a first direction; a second air blower arranged in the housing in series with the first air blower and configured to blow air from the inlet in a second direction opposite to the first direction; and a purifying filter arranged in the housing downstream of the second air blower with respect to the second direction, wherein the inlet is positioned between the first air blower and the second air blower, the first outlet is positioned downstream of the first air blower with respect to the first direction so that the air blown by the first air blower in the first direction is discharged through the first outlet, and the second outlet is positioned downstream of the purifying filter with respect to the second direction so that the air blown by the second air blower in the second direction passes through the purifying filter and is thereafter discharged through the second outlet.

18 Claims, 10 Drawing Sheets

(51) Int. Cl.
    B01D 46/10     (2006.01)
    B01D 46/44     (2006.01)
    F24F 1/0029     (2019.01)
    F24F 1/0073     (2019.01)

(52) U.S. Cl.
    CPC ............ B01D 46/44 (2013.01); F24F 1/0029
        (2013.01); F24F 1/0073 (2019.02); *B01D*
        *2273/10* (2013.01); *B01D 2273/30* (2013.01)

(58) Field of Classification Search
    CPC .... F24F 8/108; F24F 8/80; F24F 11/72; F24F
        13/20; F24F 13/28; B01D 46/0045; B01D
        46/10; B01D 46/44; B01D 2273/10;
        B01D 2273/30; B01D 46/0041; B01D
        46/12; B01D 46/444; B01D 46/46; B01D
        46/521; B01D 46/58
    See application file for complete search history.

(56)            References Cited

U.S. PATENT DOCUMENTS

| | | | |
|---|---|---|---|
| 2016/0123605 A1 | 5/2016 | Son et al. | |
| 2020/0129909 A1* | 4/2020 | Hong | F04D 25/166 |
| 2021/0396398 A1* | 12/2021 | Yoon | F24F 1/0014 |
| 2022/0008855 A1 | 1/2022 | Yang et al. | |
| 2023/0233973 A1 | 7/2023 | Osawa et al. | |

FOREIGN PATENT DOCUMENTS

| | | | |
|---|---|---|---|
| JP | 1-168316 | 7/1989 | |
| JP | H01168316 A1 * | 11/1989 | |
| JP | 5-5499 | 1/1993 | |
| KR | 20-0376821 | 3/2005 | |
| KR | 10-2005-0046082 A | 5/2005 | |
| KR | 100531087 B1 * | 11/2005 | ............. F24F 7/007 |
| KR | 10-0860532 | 9/2008 | |
| KR | 10-0977369 | 8/2010 | |
| KR | 10-2011-0107466 A | 10/2011 | |
| KR | 20110107466 A * | 10/2011 | .......... B60H 3/0035 |
| KR | 10-2015-0071981 | 6/2015 | |
| KR | 10-2015-0098320 | 8/2015 | |
| KR | 10-2016-0120421 A | 10/2016 | |
| KR | 10-2016-0142974 A | 12/2016 | |
| KR | 10-1735920 | 5/2017 | |
| KR | 10-1973554 | 4/2019 | |
| KR | 10-2019-0117068 | 10/2019 | |
| KR | 10-2247078 | 5/2021 | |
| KR | 10-2320677 | 11/2021 | |
| KR | 10-2022-0007352 | 1/2022 | |
| KR | 10-2522169 | 4/2023 | |

OTHER PUBLICATIONS

JPH01168316A Translation Obtained from Espacenet on May 30, 2025 (Year: 2025).*

KR_20110107466 Obtained from EPO on May 30, 2025 (Year: 2025).*

International Search Report, PCT/ISA/210, dated Feb. 15, 2023, in International Application No. PCT/KR2022/017616.

Extended European Search Report dated Feb. 12, 2025 for European Application No. 22925090.7.

* cited by examiner

AIR PURIFIER

CROSS REFERENCE TO RELATED APPLICATIONS

This application is a continuation application, under 35 U.S.C. § 111(a), of international application No. PCT/KR2022/017616, filed on Nov. 10, 2022, and claims priority under 35 U. S. C. § 119 to Korean Patent Application No. 10-2022-0014387, filed on Feb. 3, 2022, the disclosures of which are incorporated herein by reference in their entireties.

BACKGROUND

1. Field

The disclosure relates to an air purifier.

2. Description of the Related Art

An air purifier is a device that sucks and purifies polluted air, and discharges purified air. The air purifier sucks air including pollutants through a front inlet using an air blower, removes the pollutants by passing the sucked air through a purifying filter, and discharges the purified air through a top or side outlet. The air purifier may have a fan function. In an operation in a fan mode, air may be discharged through the front inlet. In this case, the air is sucked through an outlet and a sufficient amount of air to satisfy the fan function may not be discharged due to the flow resistance generated by a purifying filter. Thus, the fan function of the air purifier is merely an auxiliary function.

SUMMARY

Aspects of embodiments of the disclosure will be set forth in part in the description which follows and, in part, will be apparent from the description, or may be learned by practice of the presented embodiments.

According to an embodiment of the disclosure, an air purifier may include a housing including an inlet, a first outlet, and a second outlet; a first air blower arranged in the housing and configured to blow air from the inlet in a first direction; a second air blower arranged in the housing in series with the first air blower and configured to blow air from the inlet in a second direction opposite to the first direction; and a purifying filter arranged in the housing downstream of the second air blower with respect to the second direction, wherein the inlet is positioned between the first air blower and the second air blower, the first outlet is positioned downstream of the first air blower with respect to the first direction so that the air blown by the first air blower in the first direction is discharged through the first outlet, and the second outlet is positioned downstream of the purifying filter with respect to the second direction so that the air blown by the second air blower in the second direction passes through the purifying filter and is thereafter discharged through the second outlet.

According to an embodiment of the disclosure, the air purifier may further include a controller configured to selectively drive the first air blower and the second air blower so that, when the air purifier is operating in a fan mode, the first air blower is driven so that the air blown by the first air blower is discharged through the first outlet, and, when the air purifier is operating in an air purifying mode, the second air blower is driven so that the air blown by the second air blower and passing through the purifying filter is discharged through the second outlet.

According to an embodiment of the disclosure, the air purifier may further include a plurality of the first air blowers arranged in parallel; and a plurality of the second air blowers respectively paired with the plurality of first air blowers.

According to an embodiment of the disclosure, a blow capacity of the second air blower is greater than a blow capacity of the first air blower.

According to an embodiment of the disclosure, the inlet is provided on at least one of a side portion and top portion of the housing.

According to an embodiment of the disclosure, the first outlet is provided on at least one of a front portion and a side portion of the housing.

According to an embodiment of the disclosure, the second outlet is provided on at least one of a top portion and a rear portion of the housing.

According to an embodiment of the disclosure, an air purifier may include a housing including a first outlet, a second outlet, and an inlet between the first outlet and the second outlet; a first air blower arranged in the housing between the first outlet and the second outlet; a second air blower arranged in the housing between the first outlet and the second outlet; and a purifying filter positioned between the second air blower and the second outlet; wherein the air purifier is operable so that, in a fan mode of the air purifier, the first air blower is operated so that air is drawn through the inlet and blown by the first air blower so as to be discharged through the first outlet, and in an air purifying mode of the air purifier, the second air blower is operated so that air is drawn through the inlet and blown by the second air blower so as to pass through the purifying filter and thereafter be discharged through the second outlet.

According to an embodiment of the disclosure, the first air blower and the second air blower are arranged in series, and blow directions of the first air blower and the second air blower are opposite to each other.

According to an embodiment of the disclosure, the inlet is configured as a common inlet to the first air blower and the second air blower.

According to an embodiment of the disclosure, the inlet is positioned between the first air blower and the second air blower.

According to an embodiment of the disclosure, the air purifier may further include a plurality of the first air blowers arranged in parallel; and a plurality of the second air blowers respectively paired with the plurality of first air blowers.

According to an embodiment of the disclosure, a blow capacity of the second air blower is greater than a blow capacity of the first air blower.

According to an embodiment of the disclosure, an air purifier may include a housing including a fan region configured with a first outlet, an air purifying region configured with a second outlet, and a boundary region configured between the fan region and the air purifying region and including an inlet; a first air blower arranged in the boundary region; a second air blower arranged in series with the first air blower in the boundary region; a purifying filter positioned between the second air blower and the second outlet; and a controller configured to selectively drive the first air blower and the second air blower so that when the air purifier is operating in a fan mode, the first air blower is driven so that air is drawn through the inlet and blown by the first air blower so as to be discharged through the first outlet, and when the air purifier is operating in an air purifying mode, the second air blower is driven so that air is drawn through the inlet and blown by the second air blower so as to pass through the purifying filter and thereafter be discharged through the second outlet.

According to an embodiment of the disclosure, the inlet is configured as a common inlet to the first air blower and the second air blower.

According to an embodiment of the disclosure, the inlet is positioned between the first air blower and the second air blower.

According to an embodiment of the disclosure, the air purifier may further include a plurality of the first air blowers arranged in parallel; and a plurality of the second air blowers respectively paired with the plurality of first air blowers.

According to an embodiment of the disclosure, a blow capacity of the second air blower is greater than a blow capacity of the first air blower.

Additional embodiments of the disclosure will be set forth in part in the description which follows and, in part, will be obvious from the description, or will be apparent from the disclosure.

BRIEF DESCRIPTION OF DRAWINGS

These and/or other embodiments of the disclosure will become apparent and more readily appreciated from the following description of the embodiments, taken in conjunction with the accompanying drawings of which.

DETAILED DESCRIPTION

Figure 1:
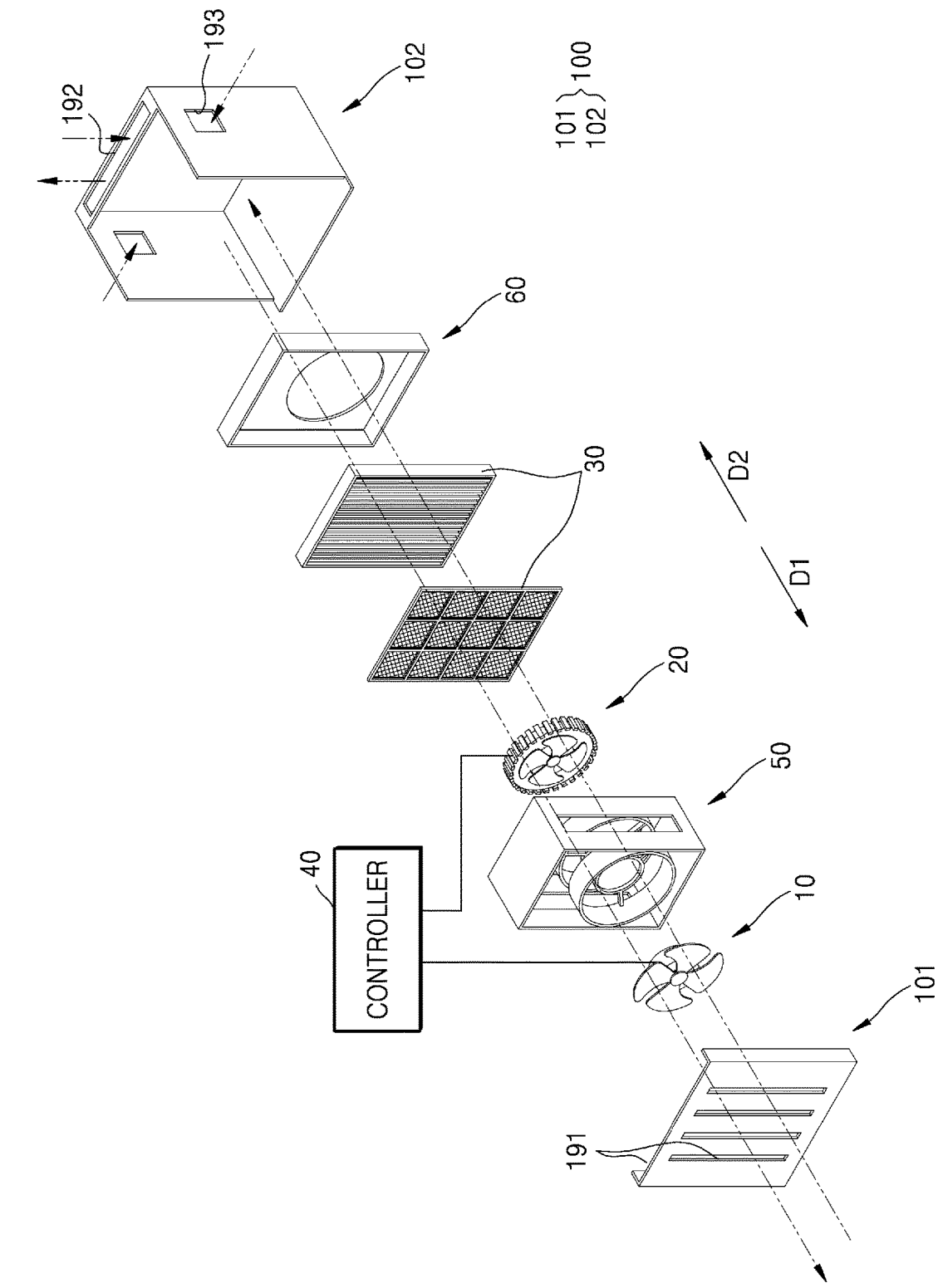
FIG. 1 is an exploded perspective view of an air purifier according to an embodiment of the disclosure.

Throughout the disclosure, the expression "at least one of a, b or c" indicates only a, only b, only c, both a and b, both a and c, both b and c, all of a, b, and c, or variations thereof.

Although terms used in the specification are selected with general terms popularly used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms may be disclosed in a corresponding description part of the disclosure. Therefore, the terms used in the disclosure should be defined not by the simple names of the terms but by the meaning of the terms and the contents throughout the disclosure. Throughout the entirety of the specification of the disclosure, when it is assumed that a certain part includes a certain component, the term 'including' means that a corresponding component may further include other components unless specially described to the contrary.

Hereinafter, embodiments of the disclosure will be described in detail with reference to the attached drawings to allow those of ordinary skill in the art to easily carry out the embodiments of the disclosure. However, the disclosure may be implemented in various different forms, and are not limited to the embodiments of the disclosure described herein. To clearly describe the disclosure, parts that are not associated with the description are omitted from the drawings, and throughout the specification, identical reference numerals refer to identical parts. Hereinafter, embodiments of the disclosure will now be described with reference to the accompanying drawings.

Figure 2:
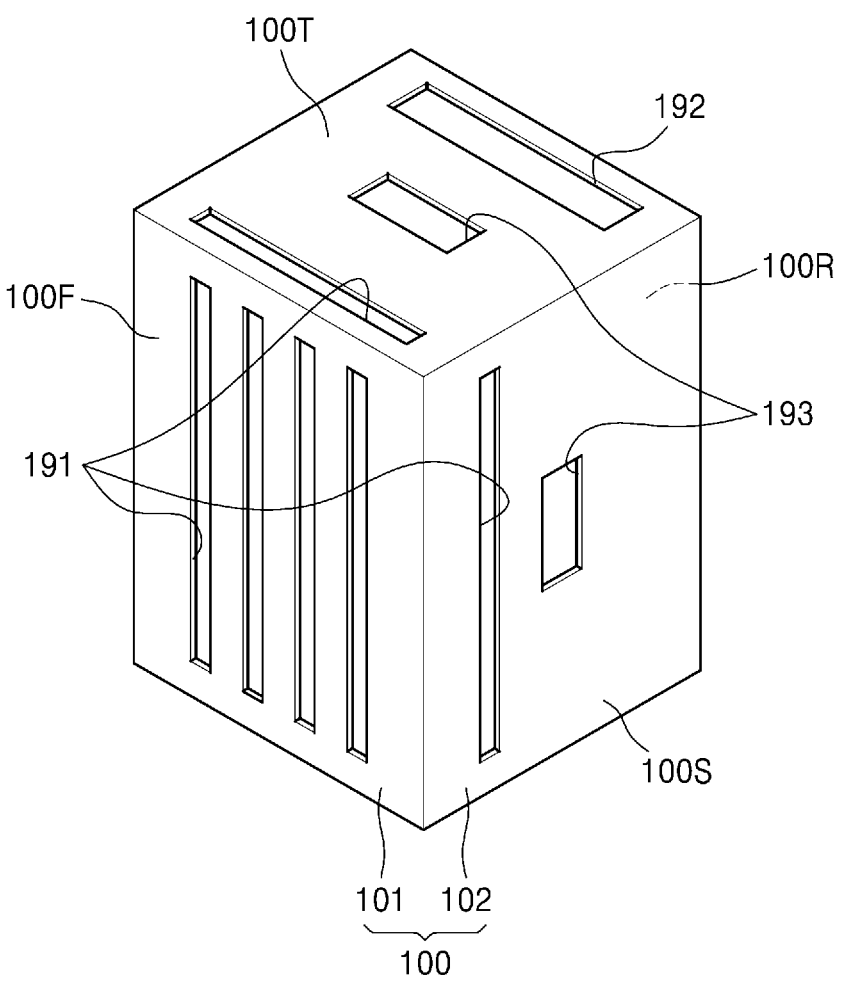
FIG. 2 is an exterior perspective view of an air purifier according to an embodiment of the disclosure.

FIG. 1 is an exploded perspective view of an air purifier according to an embodiment of the disclosure. FIG. 2 is an exterior perspective view of an air purifier according to an embodiment of the disclosure. Referring to FIGS. 1 and 2, an example of an air purifier may include a housing 100, a first air blower 10, a second air blower 20, a controller 40, and a purifying filter 30.

The housing 100 may form an air flow path. The housing 100 may function as, for example, a duct. The housing 100 may include a first outlet 191, a second outlet 192, and an inlet 193. For example, the housing 100 may include a front housing 101 and a rear housing 102. The rear housing 102 may have a shape in which a front thereof is opened, and the front housing 101 may be coupled to the rear housing 102 to block an opened front of the rear housing 102. The first outlet 191, the second outlet 192, and the inlet 193 may be a passage for communicating the housing 100 with the outside. The housing 100 may accommodate the first air blower 10, the second air blower 20, and the purifying filter 30.

Figure 3:
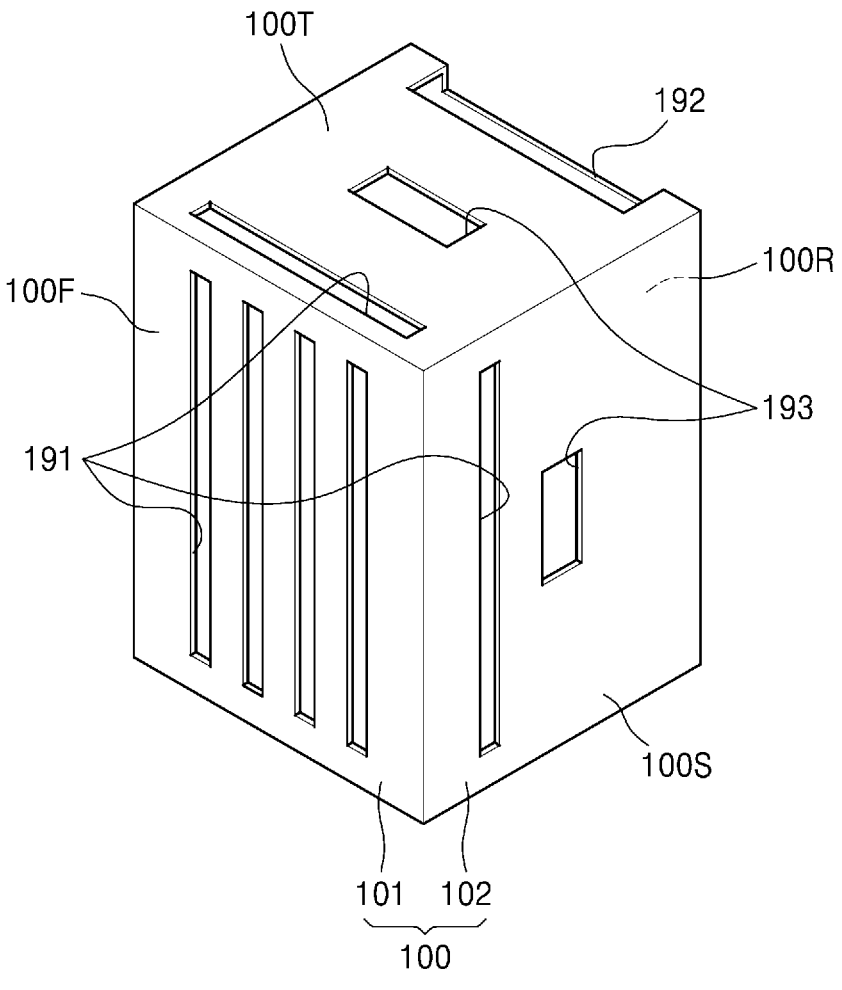
FIG. 3 is an exterior perspective view of an air purifier according to an embodiment of the disclosure.

The first outlet 191 may be provided on at least one of a front portion 100F, a side portion 100S, or a top portion 100T of the housing 100. In the current embodiment of the disclosure, the first outlet 191 may be provided on the front portion 100F, the side portion 100S, and the top portion 100T of the housing 100. Thus, in a fan mode, a sufficient amount of air may be discharged to the front. The second outlet 192 may be provided on at least one of the side portion 100S, the top portion 100T, or a rear portion 100R of the housing 100. In the current embodiment of the disclosure, the second outlet 192 may be provided on the top portion 100T of the housing 100. As shown in FIG. 3, the second outlet 192 may be formed across the top portion 100T and the rear portion 100R of the housing 100. Although not shown in the drawings, the second outlet 192 may be provided on the rear portion 100R. The inlet 193 may be positioned between the first outlet 191 and the second outlet 192. The inlet 192 may be provided on at least one of the side portion 100S or the top portion 100T of the housing 100. In the current embodiment of the disclosure, the inlet 193 may be provided on the side portion 100S and the top portion 100T of the housing 100.

Although not shown in the drawing, a damper may be provided in the inlet 193. The damper may be driven by an actuator (not shown) controlled by the controller 40 to open and close the inlet 193. For example, the damper may be supported by the housing 100, e.g., the rear housing 102, so as to pivot to an opening/closing position for opening/closing the inlet 193. The damper may also be supported by the rear housing 102 to slide to the opening/closing position. Although not shown in the drawing, a dust filter may be installed in the inlet 193 to prevent a foreign substance such as dust, etc., from being introduced into the housing 100. A type of the dust filter is not specially limited, and the dust filter may include a filter net, for example, a mesh, etc., capable of filtering out a foreign substance having a larger particle size than the purifying filter 30.

The first air blower 10 and the second air blower 20 may be arranged in series. The first air blower 10 may operate in the fan mode. The first air blower 10 may supply air in a first direction D1. The second air blower 20 may operate in an air purifying mode. The second air blower 20 may supply air in a second direction D2 that is opposite to the first direction D1. The first direction D1 is a direction in which air is sucked through the inlet 193 and air is discharged through the first outlet 191. The second direction D2 is a direction in which air is sucked through the inlet 193 and the first outlet 191 and air is discharged through the second outlet 192. Each of the first air blower 10 and the second air blower 20 may include a fan and a motor that rotates the fan. The types of the first air blower 10 and the second air blower 20 are not particularly limited. Various types of air blowers such as an axial blower, a centrifugal blower, a mixed flow blower, a cross flow blower, etc., may be employed as the first air blower 10 and the second air blower 20. As the air passes through the purifying filter 30 in the air purifying mode, air flow resistance in the air purifying mode may be greater than air flow resistance in the fan mode. Thus, a blowing capacity of the second air blower 20 may be greater than that of the first air blower 10.

The purifying filter 30 may be arranged in a downstream side of the second air blower 20 with respect to the second direction D2. The purifying filter 30 may be arranged in an upstream side of the second air blower 20 and a downstream side of the inlet 193 with respect to the second direction D2. The purifying filter 30 may include one functional filter or a plurality of functional filters. For example, the purifying filter 30 may include a dust filter that removes a particulate pollutant, a deodorizing filter that removes odors, a volatile organic compound (VOC), etc., a bio-filter that removes virus, bacteria, etc. The dust filter may be classified into classes such as medium, HEPA, ULPA, etc., according to performance. The purifying filter 30 may be exchangeably accommodated in the housing 100.

The first air blower 10, the second air blower 20, and the purifying filter 30 may be accommodated in the housing 100. The first outlet 191 may be arranged in a downstream side of the first air blower 10 with respect to the first direction D1. The second outlet 192 may be arranged in a downstream side of the second air blower 20 and a downstream side of the purifying filter 30 with respect to the second direction D2. As a result, the first air blower 10 and the second air blower 20 may be located apart from each other between the first outlet 191 and the second outlet 192. The inlet 193 may be located in an upstream side of the first air blower 10 with respect to the first direction D1 and in the upstream side of the second air blower 20 with respect to the second direction D2. The inlet 193 may be positioned between the first air blower 10 and the second air blower 20. The inlet 193 may function as a common inlet of the first air blower 10 and the second air blower 20.

The first air blower 10 and the second air blower 20 may be installed on a frame 50. The purifying filter 30 may be installed on a filter cover 60. The filter cover 60 may be coupled to the frame 50. The frame 50 on which the first air blower 10 and the second air blower 20 are installed and the filter cover 60 on which the purifying filter 30 is installed may be accommodated inside the housing 100. The front housing 101 may be separated from the rear housing 102. Once the front housing 101 is separated, the first air blower 10 may be exposed for maintenance such as inspection, cleaning, etc., thereof. In addition, the front housing 101 may be separated and maintenance such as inspection, cleaning, etc., of the second air blower 20 may be possible.

The controller 40 may include an operation control circuit that controls an operation of an air purifier, a user interface that includes an input unit to receive a user input and an output unit to display a control state, a motor control circuit that controls a blow motor, a power control module, and so forth. The controller 40 may selectively drive the first air blower 10 and the second air blower 20 in the fan mode and the air purifying mode. The controller 40 may drive the first air blower 10 in the first direction D1 in the fan mode, and drive the second air blower 20 in the second direction D2 in the air purifying mode. The controller 40 may drive the first air blower 10 to discharge air in the first direction D1 toward the first outlet 191 in the fan mode, and drive the first air blower 10 to discharge air in the second direction D2 toward the second outlet 192 in the air purifying mode.

Each of the first air blower 10 and the second air blower 20 may include a blow motor. A type of the blow motor is not specially limited. The blow motor may be an alternating current (AC) motor or a direct current (DC) motor. The blow motor may be, for example, a 3-phase brushless motor. The blow motor may include a stator and a rotator. The stator may include a plurality of coils. The rotator may include a plurality of magnetic poles. For example, the rotator may include four magnetic poles, and the stator may include six coil portions. Each two of the six coil portions may have a U phase, a V phase, and W phase. The blow motor may be driven by a combination of magnetic poles induced in the U phase, the V phase, and the W phase. The blow motor may be driven in a clockwise direction or a counterclockwise direction by a combination of magnetic poles induced in the U phase, the V phase, and the W phase.

Figure 4:
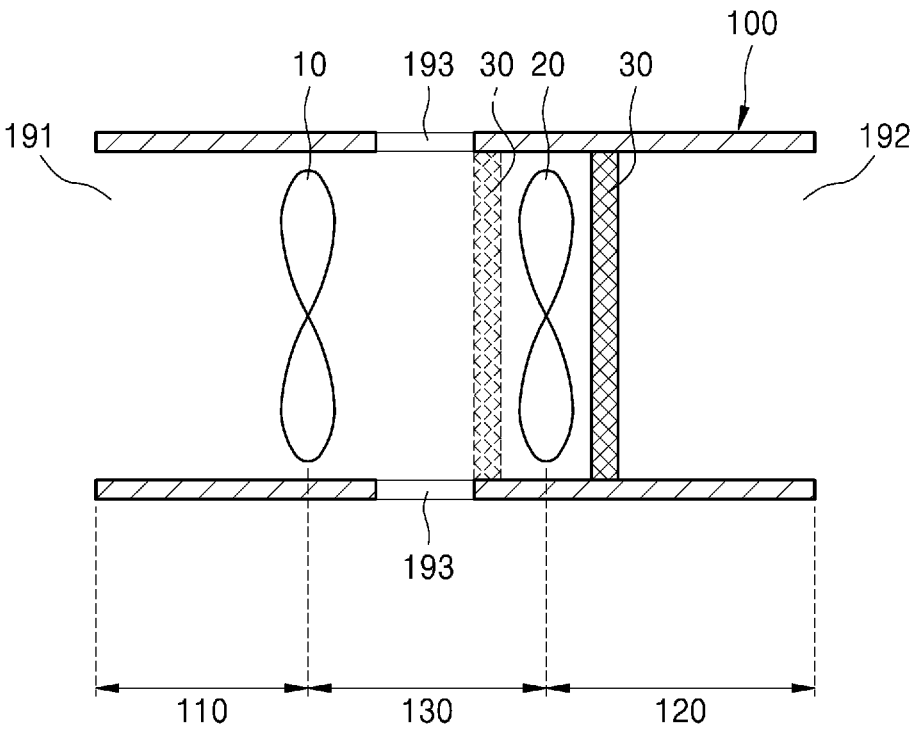
FIG. 4 shows an arrangement of components with respect to an air flow direction in an air purifier according to an embodiment of the disclosure.

FIG. 4 shows arrangement of components with respect to an air flow direction of an air purifier according to an embodiment of the disclosure. In FIG. 4, the housing 100 forming the duct is schematically shown in the form of a straight line. Referring to FIG. 4, the housing 100 may include a fan region 110, an air purifying region 120, and a boundary region 130 between the fan region 110 and the air purifying region 120. The fan region 110 may extend in the first direction D1 with respect to the boundary region 130. The first outlet 191 may be provided in the fan region 110. The air purifying region 120 may extend in the second direction D2 with respect to the boundary region 130. The second outlet 192 may be provided in the air purifying region 120. The inlet 193 may be provided in the boundary region 130.

The first air blower 10 and the second air blower 20 may be serially arranged in the boundary region 130. The first air blower 10 and the second air blower 20 may be arranged apart from each other. The first air blower 10 may be located close to the fan region 110 in the boundary region 130. The second air blower 20 may be located close to the air purifying region 110 in the boundary region 130. The inlet 193 may be positioned between the first air blower 10 and the second air blower 20 to function as a common inlet of the first air blower 10 and the second air blower 20. The purifying filter 30 may be positioned in the air purifying region 120. For example, the purifying filter 30 may be positioned between the second air blower 20 and the second outlet 192. As shown by a dotted line in FIG. 4, the purifying filter 30 may be arranged in the upstream side of the second air blower 20 with respect to the second direction D2. The purifying filter 30 may be positioned in the downstream side of the inlet 193 with respect to the second direction D2. In this case, it may be seen that the purifying filter 30 is arranged in the boundary region 130.

Figure 5:
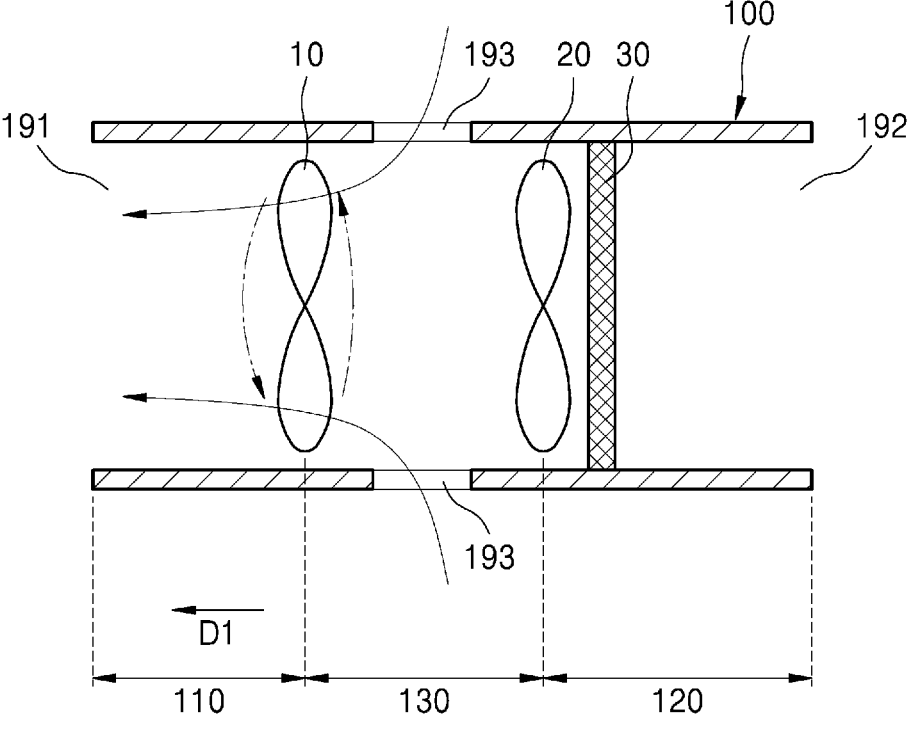
FIG. 5 is a schematic diagram showing a fan mode according to an embodiment of the disclosure.
Figure 6:
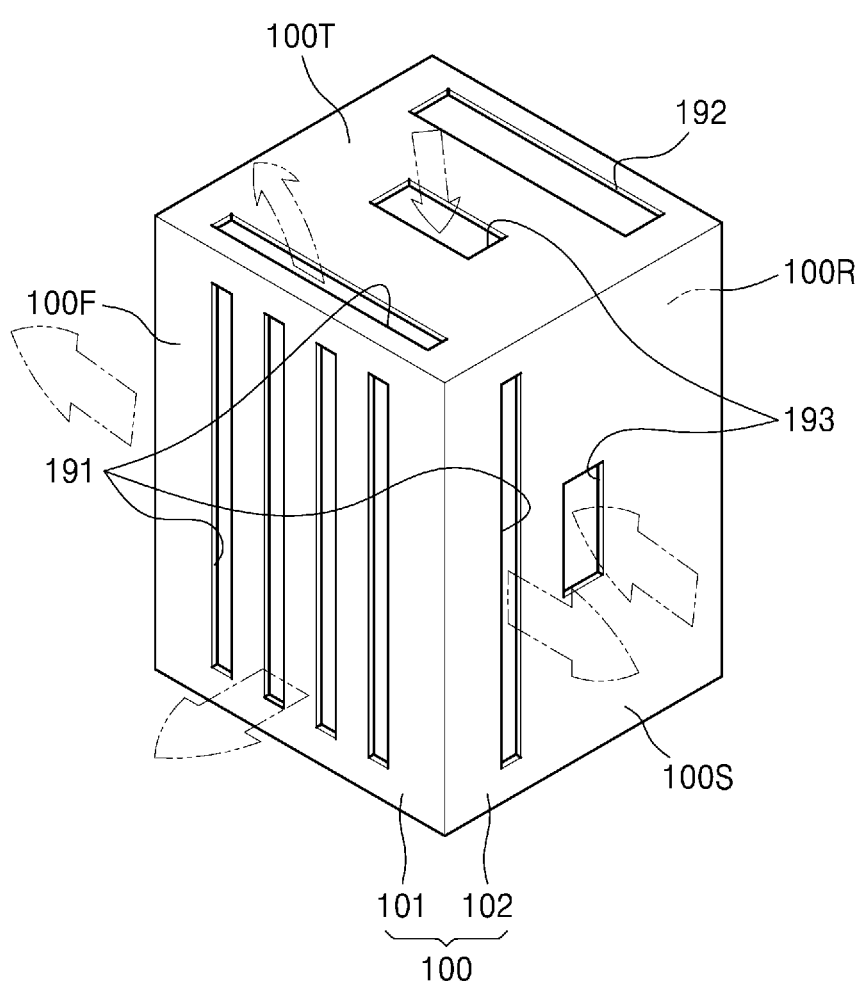
FIG. 6 is an exterior perspective view of an air purifier showing a fan mode according to an embodiment of the disclosure.
Figure 7:
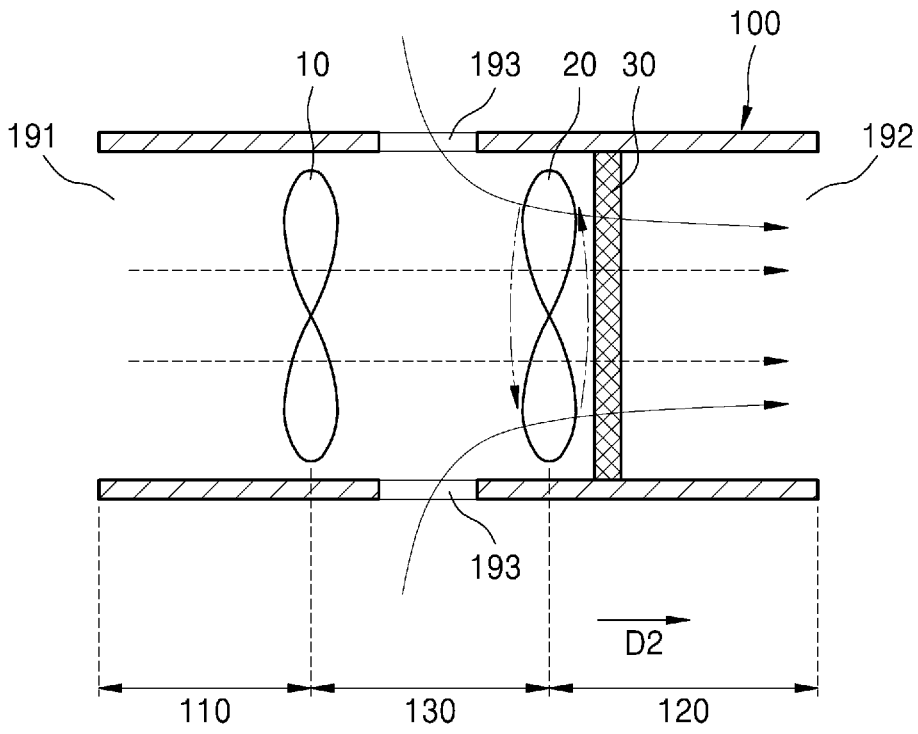
FIG. 7 is a schematic diagram showing an air purifying mode according to an embodiment of the disclosure.
Figure 8:
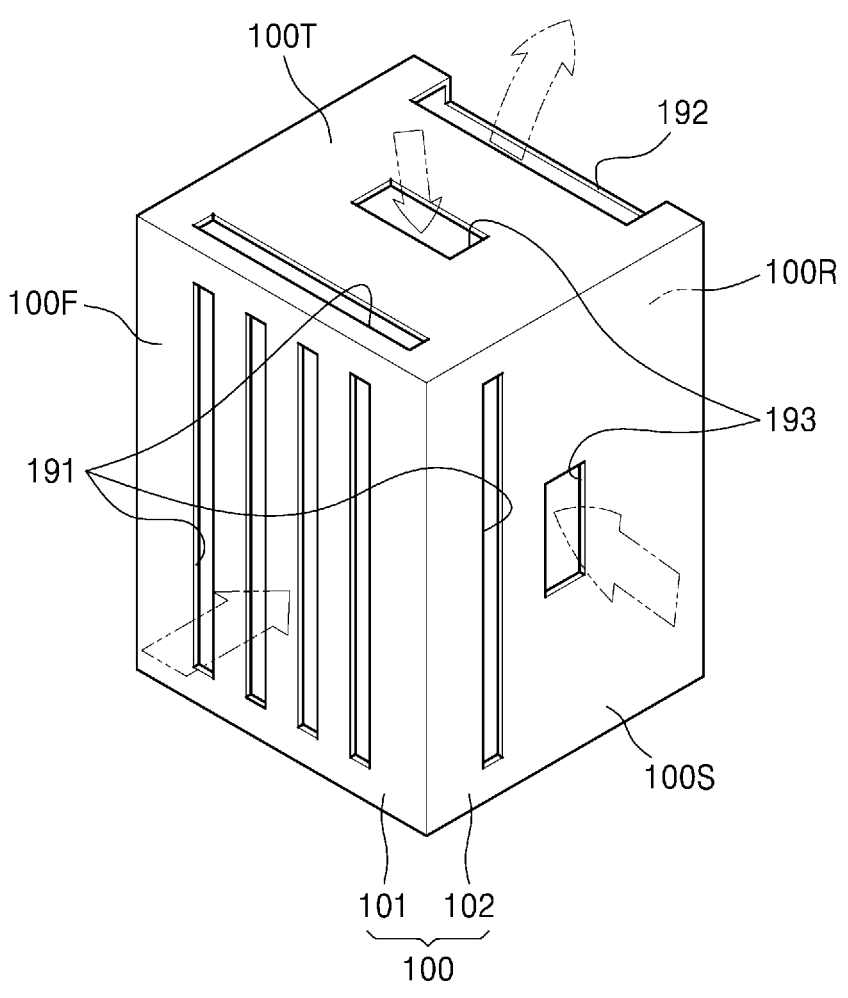
FIG. 8 is an exterior perspective view of an air purifier showing an air purifying mode according to an embodiment of the disclosure.

FIG. 5 is a schematic diagram showing a fan mode. FIG. 6 is an exterior perspective view of an air purifier showing a fan mode. FIG. 7 is a schematic diagram showing an air purifying mode. FIG. 8 is an exterior perspective view of an air purifier showing an air purifying mode. FIGS. 5 and 7 schematically show the housing 100 forming the duct in the form of a straight line.

A process of using the air purifier in the fan mode will be described with reference to FIGS. 5 and 6. The controller 40 may drive the first air blower 10. The first air blower 10 may supply air in the first direction D1. Air may be sucked into the housing 100 through the inlet 193. The air may be partially sucked into the housing 100 through the second outlet 192. The inlet 193 is located in the upstream side of the first air blower 10 and in the downstream side of the purifying filter 30 with respect to the first direction D1, such that air may mainly flow into the housing 100 through the inlet 193 having a small flow resistance. Thus, a sufficient amount of air may be discharged through the first outlet 191. Depending on a need, the controller 40 may drive the second air blower 20 in a reverse direction, i.e., in the first direction D1 in the fan mode. With this structure, the amount of air sucked through the second outlet 192 may increase, thereby increasing the amount of air to be discharged to the first outlet 191 as a whole.

Next, a process of using the air purifier in the air purifying mode will be described with reference to FIGS. 7 and 8. The controller 40 may drive the second air blower 20. The second air blower 20 may supply air in the second direction D2. Air may be sucked into the housing 100 through the inlet 193. The air may also be sucked into the housing 100 through the first outlet 191. As the sucked air passes through the purifying filter 30, a pollutant in the air may be removed. The purified air may be discharged to the outside of the housing 100 through the second outlet 192. Thus, the air purifying mode may be implemented. In the air purifying mode, the controller 40 may drive the first air blower 10 in the reverse direction, i.e., in the second direction D2. Based on this structure, the amount of air sucked through the first outlet 191 increases, thereby increasing the amount of air to be discharged of the purified air as a whole and thus increasing an air purifying capacity. When the first air blower 10 and the second air blower 20 are driven together in the air purifying mode, rotation speeds of the first air blower 10 and the second air blower 20 may be different from each other. For example, the rotation speed of the first air blower 10 may be lower than that of the second air blower 20.

In a conventional air purifier having no inlet for the fan mode, air sucked through a second outlet is discharged to a first outlet through the purifying filter 30 in the fan mode, such that it is difficult to discharge a sufficient amount of air through the first outlet 191 due to a large flow resistance. To increase the amount of air in the fan mode, an air blower having a large capacity needs to be employed and, in this case, the size of the air purifier may increase and electric energy consumed by the air blower may increase. In the air purifier according to the current embodiment of the disclosure, by providing the inlet 193 at a position in which air may be supplied into the housing 100 without passing through the purifying filter 30 in the fan mode, the fan mode may be implemented where a sufficient amount of air may be discharged to the outside of the housing 100 through the first outlet 191 without increasing the capacity of the first air blower 10 or increasing electric energy applied to the first air blower 10. Thus, it is possible to implement a compact and low-energy-consumption air purifier that may be driven in the air purifying mode and in the fan mode having a sufficient blow amount.

Figure 9:
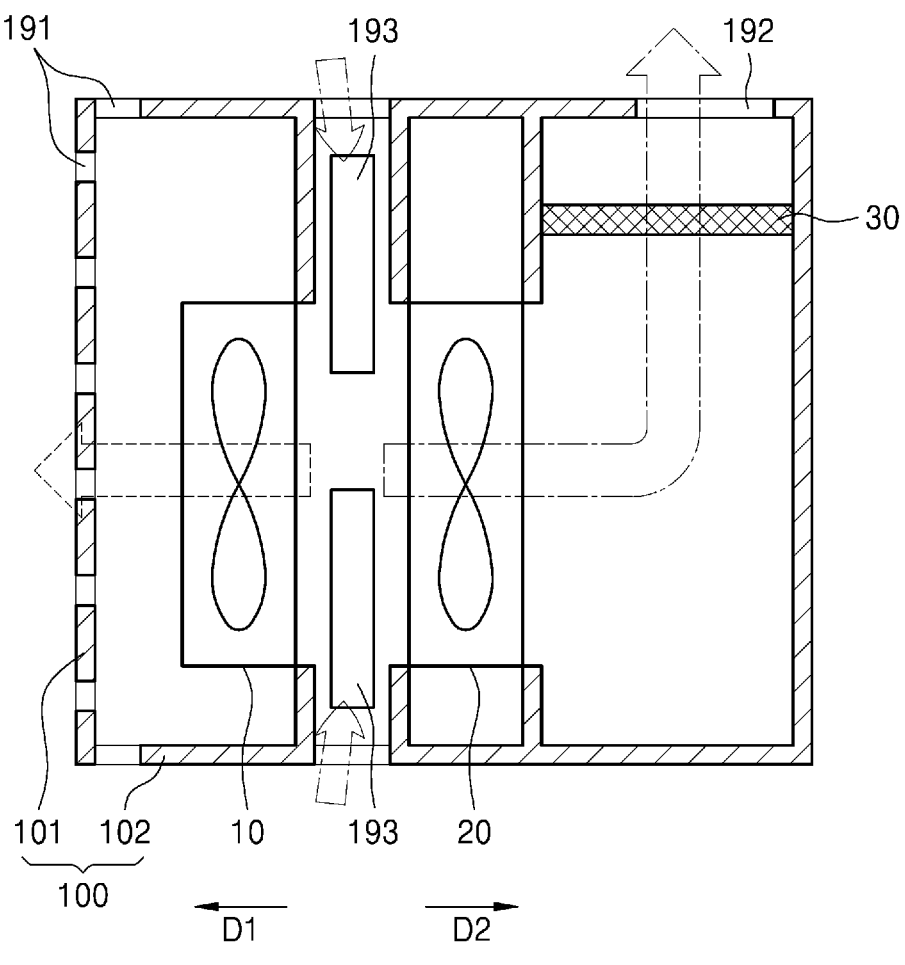
FIG. 9 is a schematic diagram of an air purifier according to an embodiment of the disclosure.

FIG. 9 is a schematic diagram of an air purifier according to an embodiment of the disclosure. Referring to FIG. 9, the air purifier according to the current embodiment of the disclosure is different from an example of the air purifier shown in FIGS. 1 to 4 in that the air purifying region 120 is bent upwardly and the purifying filter 30 is arranged adjacent to the second outlet 192.

Figure 10:
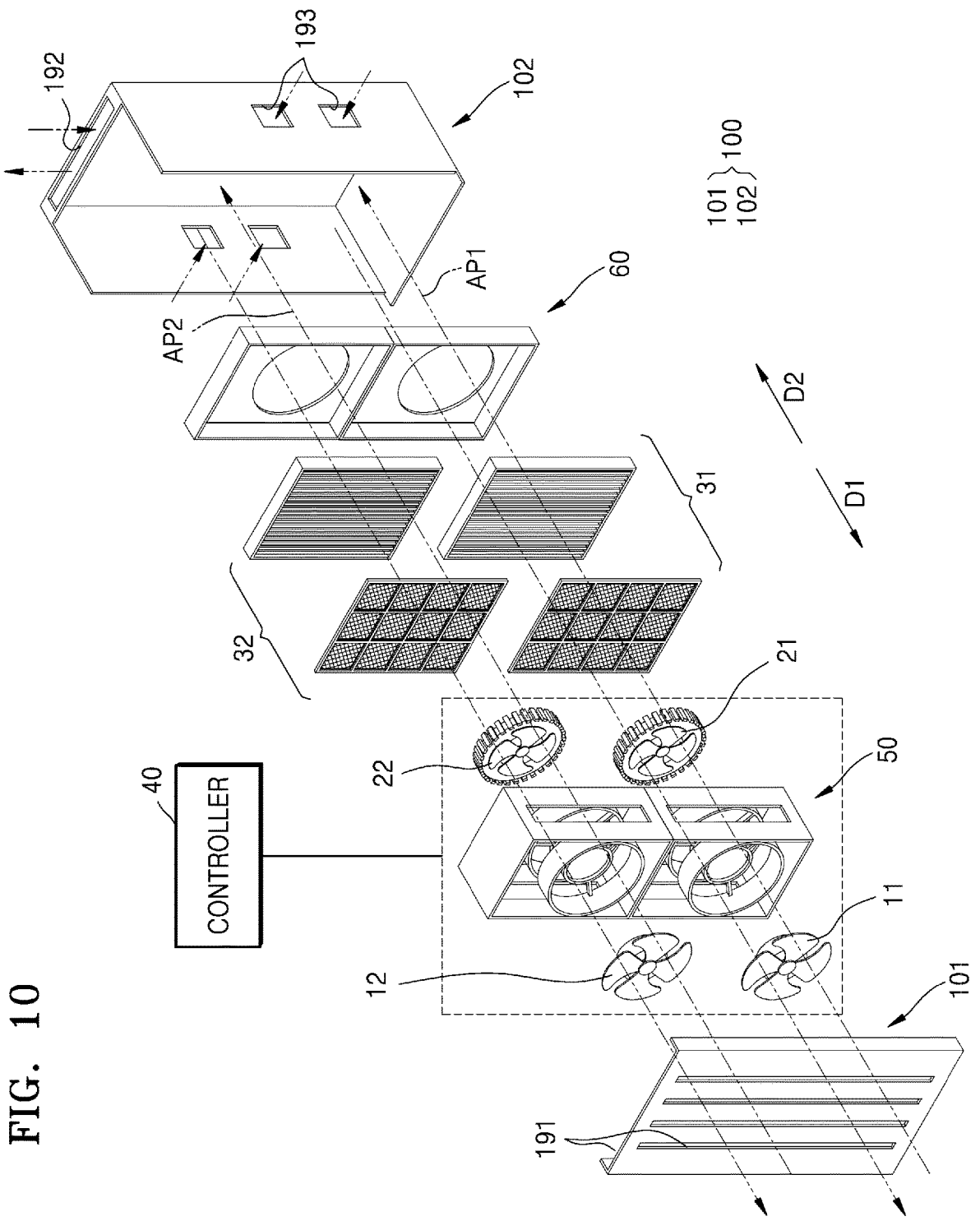
FIG. 10 is an exploded perspective view of an air purifier according to an embodiment of the disclosure.

The air purifier may include a plurality of first air blowers 10. The plurality of first air blowers 10 may be arranged in parallel. The air purifier may include a plurality of second air blowers 20 respectively paired with the plurality of first air blowers 10. The number of pairs of the first air blower and the second air blower may be determined according to an environment where the air purifier is used, e.g., the size of a purifying space, an average degree of pollution, etc. FIG. 10 is an exploded perspective view of an air purifier according to an embodiment of the disclosure. The air purifier according to the current embodiment of the disclosure is different from examples of the air purifier described with reference to FIGS. 1 to 9 in that two first air blowers 11 and 12 arranged in parallel and two second air blowers 21 and 22 respectively paired with the two first air blowers 11 and 12 are employed. Hereinbelow, components functioning in the same manner as the components described in FIGS. 1 to 9 will be referred to as identical reference numerals and will not be described redundantly. Referring to FIG. 10, the example of the air purifier may include the housing 100, the first air blowers 11 and 12, the second air blowers 21 and 22, the controller 40, and purifying filters 31 and 32.

The two first air blowers 11 and 12 may be arranged in a vertical direction. Although not shown in the drawing, the first air blowers 11 and 12 may be arranged in a horizontal direction. A structure of the first air blowers 11 and 12 may be the same as that of the air blower 10 described above. The two second air blowers 21 and 22 may be arranged in series with the first air blowers 11 and 12, respectively. A structure of the second air blowers 21 and 22 may be the same as that of the air blower 20 described above. A blowing capacity of the second air blowers 21 and 22 may be greater than that of the first air blowers 11 and 12. The purifying filters 31 and 32 may respectively correspond to the second air blowers 21 and 22. The purifying filters 31 and 32 may be the same as the purifying filter 30 described above. The frame 50 may have a shape capable of accommodating the first air blowers 11 and 12 and the second air blowers 21 and 22. The filter cover 60 may have a shape capable of accommodating the purifying filters 31 and 32. The filter cover 60 may be coupled to the frame 50. The frame 50 in which the first air blowers 11 and 12 and the second air blowers 21 and 22 are installed and the filter cover 60 in which the purifying filters 31 and 32 are installed may be accommodated inside the housing 100.

The controller 40 may include a control circuit for driving the first air blowers 11 and 12 and the second air blowers 21 and 22. The controller 40 may drive the first air blowers 11 and 12 and the second air blowers 21 and 22 in the first direction D1 or the second direction D2. The controller 40 may drive, for example, any one or both of the first air blowers 11 and 12 in the first direction D1 according to a blow step in the fan mode. The controller 40 may drive the lower first air blower 11 or the upper first air blower 12 according to a user's selection in the fan mode. In the fan mode, the controller 40 may drive at least one of the first air blowers 11 and 12 and at least one of the second air blowers 21 and 22 in the first direction D1. In this case, not only a combination of the first air blower 11 and the second air blower 21 and a combination of the first air blower 12 and the second air blower 22, but also a combination of the first air blower 11 and the second air blower 22 and a combination of the first air blower 12 and the second air blower 21 may be possible. Both of the first air blowers 11 and 12 and the second air blowers 21 and 22 may be driven in the first direction D1.

The controller 40 may drive, for example, any one or both of the second air blowers 21 and 22 in the second direction D2 according to a blow step in the air purifying mode. The controller 40 may drive the lower second air blower 21 or the upper second air blower 22 according to a user's selection in the air purifying mode. In the air purifying mode, the controller 40 may drive at least one of the first air blowers 11 and 12 and at least one of the second air blowers 21 and 22 in the second direction D2. In this case, not only a combination of the first air blower 11 and the second air blower 21 and a combination of the first air blower 12 and the second air blower 22, but also a combination of the first air blower 11 and the second air blower 22 and a combination of the first air blower 12 and the second air blower 21 may be possible. Both of the first air blowers 11 and 12 and the second air blowers 21 and 22 may be driven in the second direction D2.

Purified air supplied by the second air blowers 21 and 22 may be discharged to the second outlet 192. Although not shown in the drawing, a first air purifying flow path AP1 corresponding to the second air blower 21 and a second air purifying flow path AP2 corresponding to the second air blower 22 may be separated from each other. In this case, the second outlet 192 may be provided on each of the top portion 100T and the rear portion 100R of the housing 100. The first air purifying flow path AP1 may be connected to the second outlet 192 provided on the rear portion 100R, and the second air purifying flow path AP2 may be connected to the second outlet 192 provided on the top portion 100T. In this way, the purified air may be discharged through the two outlets 192 by the second air blowers 21 and 22. In an embodiment of the disclosure, the first air purifying flow path AP1 may be connected to the second outlet 192 provided on the rear portion 100R, and the second air purifying flow path AP2 may be connected to the two second outlets 192 provided on the rear portion 100R and the top portion 100T.

To implement a fan function having a sufficient blow amount in the air purifier, a large air blower having a large capacity may be used. In this case, the air purifier may be enlarged. Moreover, energy consumption of the air purifier may increase. The disclosure provides a compact air purifier having a fan function and an air purifying function. The disclosure provides an air purifier having a fan function and an air purifying function, which is capable of reducing energy consumption.

An air purifier according to an embodiment of the disclosure may include a first air blower configured to supply air in a first direction, a second air blower arranged in series with the first air blower and configured to supply air in a second direction opposite to the first direction, a purifying filter arranged in a downstream side of the second air blower with respect to the second direction, and a housing configured to accommodate the first air blower, the second air blower, and the purifying filter, and including a first outlet positioned in a downstream side of the first air blower with respect to the first direction, a second outlet positioned in a downstream side of the purifying filter with respect to the second direction, and an inlet positioned between the first air blower and the second air blower.

The air purifier according to an embodiment may further include a controller configured to selectively drive the first air blower and the second air blower in a fan mode and an air purifying mode.

According to an embodiment of the disclosure, a plurality of the first air blowers may be arranged in parallel and a plurality of the second air blowers may be respectively paired with the plurality of first air blowers.

According to an embodiment of the disclosure, a blow capacity of the second air blower may be greater than a blow capacity of the first air blower.

According to an embodiment of the disclosure, the inlet may be provided on at least one of a side portion or a top portion of the housing.

According to an embodiment of the disclosure, the first outlet may be provided on at least one of a front portion or a side portion of the housing.

According to an embodiment of the disclosure, the second outlet may be provided on at least one of a top portion or a rear portion of the housing.

An air purifier according to an embodiment of the disclosure includes a housing including a first outlet, a second outlet, and an inlet between the first outlet and the second outlet and configured to form a flow path of air, a first air blower arranged between the first outlet and the second outlet and configured to discharge air to the first outlet in a fan mode, a second air blower arranged between the first outlet and the second outlet and configured to discharge air to the second outlet in an air purifying mode, and a purifying filter positioned between the second air blower and the second outlet.

According to an embodiment of the disclosure, the first air blower and the second air blower may be arranged in series, and blow directions of the first air blower and the second air blower may be opposite to each other.

According to an embodiment of the disclosure, the inlet may function as a common inlet of the first air blower and the second air blower.

According to an embodiment of the disclosure, the inlet may be positioned between the first air blower and the second air blower.

According to an embodiment of the disclosure, a plurality of the first air blowers may be arranged in parallel and a plurality of the second air blowers may be respectively paired with the plurality of first air blowers.

According to an embodiment of the disclosure, a blow capacity of the second air blower may be greater than a blow capacity of the first air blower.

An air purifier according to an embodiment of the disclosure includes a housing including a fan region provided with a first outlet, an air purifying region provided with a second outlet, and a boundary region positioned between the fan region and the air purifying region and provided with an inlet, a first air blower arranged in the boundary region and configured to discharge air through the first outlet, a second air blower arranged in series with the first air blower in the boundary region and configured to suck air and discharge the air through the second outlet, a purifying filter positioned between the second air blower and the second outlet, and a controller configured to selectively drive the first air blower and the second air blower in a fan mode and an air purifying mode.

According to an embodiment of the disclosure, the inlet may function as a common inlet of the first air blower and the second air blower.

According to an embodiment of the disclosure, the inlet may be positioned between the first air blower and the second air blower.

According to an embodiment of the disclosure, a plurality of the first air blowers may be arranged in parallel and a plurality of the second air blowers may be respectively paired with the plurality of first air blowers.

According to an embodiment of the disclosure, a blow capacity of the second air blower may be greater than a blow capacity of the first air blower.

In the air purifier according to the disclosure, by locating an inlet between a first air blower and a second air blower that are arranged in series, the compact air purifier may be implemented, which may be driven in the air purifying mode and the fan mode having a sufficient blow amount.

While the embodiments of the disclosure have been shown and described, the scope of the disclosure is not limited to the description and also includes various modifications and improvements made by those of ordinary skill in the art using the concept of the disclosure defined in the appended claims.

What is claimed is:

1. An air purifier comprising:
a housing including an inlet, a first outlet, and a second outlet;
a first air blower arranged in the housing and configured to blow air from the inlet in a first direction;
a second air blower arranged in the housing in series with the first air blower and configured to blow air from the inlet in a second direction opposite to the first direction; and
a purifying filter arranged in the housing downstream of the second air blower with respect to the second direction,
wherein,
the inlet is positioned between the first air blower and the second air blower,
the first outlet is positioned downstream of the first air blower with respect to the first direction so that the air blown by the first air blower in the first direction is discharged through the first outlet, and so that the air from the inlet blown in the first direction is discharged without being filtered, and
the second outlet is positioned downstream of the purifying filter with respect to the second direction so that the air blown by the second air blower in the second direction passes through the purifying filter and is thereafter discharged through the second outlet.

2. The air purifier of claim 1, further comprising:
a controller configured to selectively drive the first air blower and the second air blower so that,
when the air purifier is operating in a fan mode, the first air blower is driven so that the air blown by the first air blower is discharged through the first outlet, and,
when the air purifier is operating in an air purifying mode, the second air blower is driven so that the air blown by the second air blower and passing through the purifying filter is discharged through the second outlet.

3. The air purifier of claim 1, further comprising:
a plurality of the first air blowers arranged in parallel; and a plurality of the second air blowers respectively paired with the plurality of first air blowers.

4. The air purifier of claim 1, wherein a blow capacity of the second air blower is greater than a blow capacity of the first air blower.

5. The air purifier of claim 1, wherein the inlet is provided on at least one of a side portion and top portion of the housing.

6. The air purifier of claim 1, wherein the first outlet is provided on at least one of a front portion and a side portion of the housing.

7. The air purifier of claim 1, wherein the second outlet is provided on at least one of a top portion and a rear portion of the housing.

8. An air purifier comprising:
a housing including a first outlet, a second outlet, and an inlet between the first outlet and the second outlet;
a first air blower arranged in the housing between the first outlet and the second outlet;
a second air blower arranged in the housing between the first outlet and the second outlet; and
a purifying filter positioned between the second air blower and the second outlet;
wherein the air purifier is operable so that,
in a fan mode of the air purifier, the first air blower is operated so that air is drawn through the inlet and blown by the first air blower so as to be discharged through the first outlet without being filtered, and
in an air purifying mode of the air purifier, the second air blower is operated so that air is drawn through the inlet and blown by the second air blower so as to pass through the purifying filter and thereafter be discharged through the second outlet.

9. The air purifier of claim 8, wherein,
the first air blower and the second air blower are arranged in series, and
blow directions of the first air blower and the second air blower are opposite to each other.

10. The air purifier of claim 9, wherein the inlet is configured as a common inlet to the first air blower and the second air blower.

11. The air purifier of claim 9, wherein the inlet is positioned between the first air blower and the second air blower.

12. The air purifier of claim 9, further comprising:
a plurality of the first air blowers arranged in parallel; and
a plurality of the second air blowers respectively paired with the plurality of first air blowers.

13. The air purifier of claim 8, wherein a blow capacity of the second air blower is greater than a blow capacity of the first air blower.

14. An air purifier comprising:
a housing comprising:
a fan region configured with a first outlet,
an air purifying region configured with a second outlet, and
a boundary region configured between the fan region and the air purifying region and including an inlet;
a first air blower arranged in the boundary region;
a second air blower arranged in series with the first air blower in the boundary region;
a purifying filter positioned between the second air blower and the second outlet; and
a controller configured to selectively drive the first air blower and the second air blower so that:
when the air purifier is operating in a fan mode, the first air blower is driven so that air is drawn through the inlet and blown by the first air blower so as to be discharged through the first outlet without being filtered, and when the air purifier is operating in an air purifying mode, the second air blower is driven so that air is drawn through the inlet and blown by the second air blower so as to pass through the purifying filter and thereafter be discharged through the second outlet.

15. The air purifier of claim 14, wherein the inlet is configured as a common inlet to the first air blower and the second air blower.

16. The air purifier of claim 14, wherein the inlet is positioned between the first air blower and the second air blower.

17. The air purifier of claim 14, further comprising:

a plurality of the first air blowers arranged in parallel; and a plurality of the second air blowers respectively paired with the plurality of first air blowers.

18. The air purifier of claim 14, wherein a blow capacity of the second air blower is greater than a blow capacity of the first air blower.

* * * * *